March 22, 1966     A. PIRRELLO     3,241,459

RECIPROCATING TOOL

Filed May 12, 1964

INVENTOR.

Antonio Pirrello

BY Hugh L. Fisher

ATTORNEY

United States Patent Office 3,241,459
Patented Mar. 22, 1966

3,241,459
RECIPROCATING TOOL
Antonio Pirrello, Lincoln Park, Mich., assignor to General Motors Corporation, Detroit, Mich., a corporation of Delaware
Filed May 12, 1964, Ser. No. 366,796
9 Claims. (Cl. 91—234)

This invention relates to improvements in reciprocating tools.

Among the problems encountered with reciprocating tools, e.g., hand-operated power tools requiring reciprocating motion of a tool such as a scraper, a saw, a polisher, etc., are those relating to size and to vibration. Obviously, a hand-operated power tool, if large and subject to considerable vibration, can produce unwanted fatigue of the operator. Then too, vibrations can cause damage to workpieces, particularly when the workpiece has thin sections.

To overcome these and other related problems, a novel reciprocating tool is proposed that affords vibration-free operation and that is relatively small in size. More specifically, a reciprocating tool is proposed that employs oppositely acting elements which are actuated by fluid pressure. The masses of these members and a driven member are correlated so as to cancel vibrations without need for complicated dampener systems. Moreover, the novel reciprocating tool overcomes tool stall problems.

Figure 1:
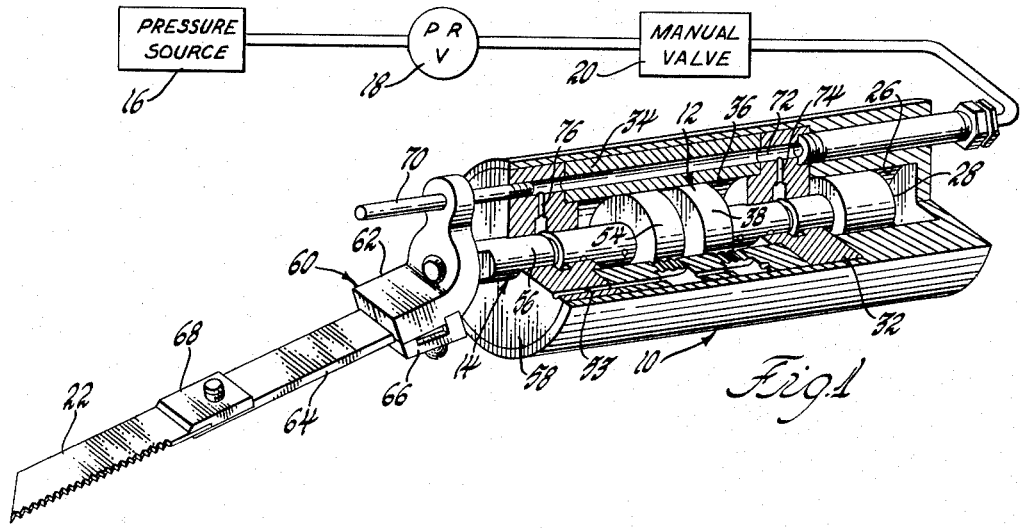
Figure 2:
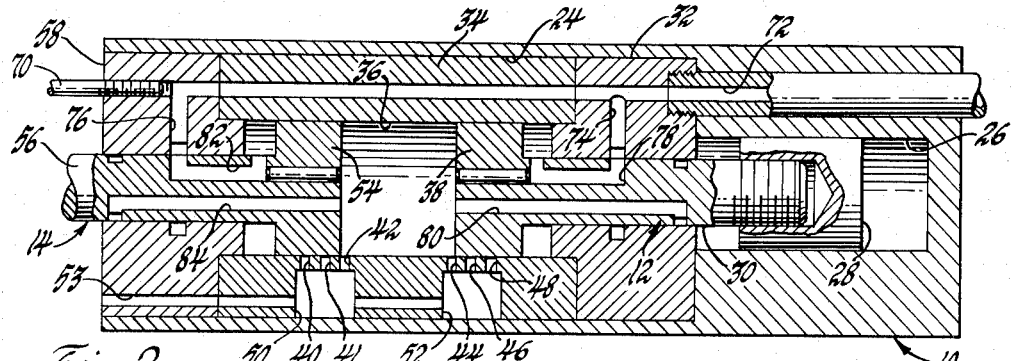
Figure 3:
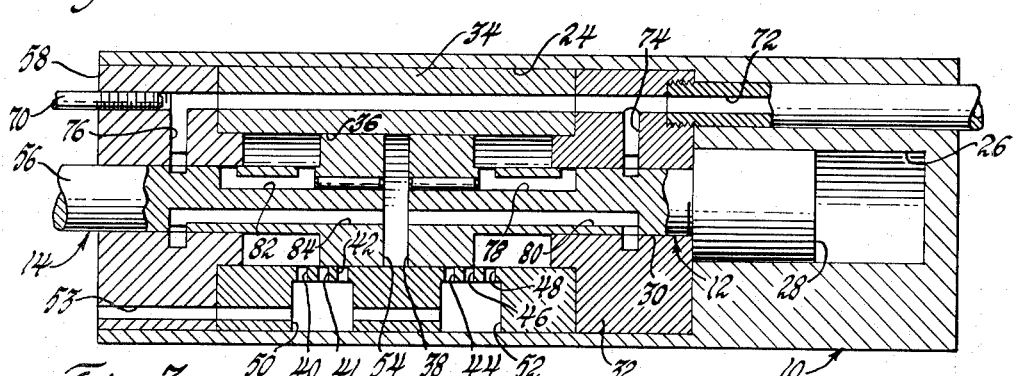

The foregoing and other objects and advantages of the invention will become apparent from the following description and from the accompanying drawings, in which:

FIGURE 1 is a perspective partially cut-away view of a reciprocating tool embodying the principles of the invention; and FIGURES 2 and 3 are central longitudinal sectional views of the reciprocating tool illustrating different operating states.

Considering first FIGURE 1, the numeral 10 denotes a housing or a cylinder formed of some lightweight durable material, such as aluminum. The size of the cylinder 10 can be relatively small for reasons that will become more apparent, so as to be easily grasped in one's hand. The cylinder 10 also may be contoured in any suitable way so as to facilitate the maintenance of a hand-held grip; for instance, finger grooves may be provided. Housed within the cylinder 10 is a pair of movable elements, such as pistons 12 and 14, which will hereinafter be referred to respectively as the dampener piston and the drive piston. The pistons 12 and 14 are caused to reciprocate relative to each other by energy, which may be derived from a pressure source 16. Preferably the pressure source supplies air at a pressure determined by a suitable pressure regulator valve 18 under the control of a manual valve 20, which may be of any of the known valves used to control compressed air flow. When the manual valve 20 is opened the air pressure will cause the pistons 12 and 14 to reciprocate and, accordingly, reciprocate a driven member; for instance, a saw tool 22 that is drive-connected to the drive piston 14 in a way to be explained more in detail.

Instead of air, a liquid may be employed with only minor modifications. These modifications will readily occur to those versed in this art.

Referring now to FIGURE 2 for the details of the cylinder 10 and its preferred method of assemblage, it will be noted that the cylinder 10 has a large bore 24 and a small bore 26. The small bore 26 slidably houses a cylindrical weight 28, which is releasably joined as by screw threads to a stem 30 of the dampener piston 12. The stem 30 is in turn slidable within the bore of an inside end cap 32. The inside end cap 32 is, of course, installed on the stem 30 before the weight 28 is attached and has a slidable fit with respect to the large cylinder bore 24. Once the inside end cap 32 is installed a sleeve 34 is positioned within the large cylinder bore 24 and in abutting relation with the inside end cap 32. The sleeve 34 has an inside bore 36 for slidably receiving a head 38 of the dampener piston 12. The sleeve 34 is also provided with two sets of three exhaust openings which have been assigned the numbers 40 through 48, inclusive. These exhaust openings 40–48 intercommunicate with the bore 36 and the exterior of the cylinder 10 through exhaust ports 50 and 52 and an exhaust passage 53.

The drive piston 14 has a head 54 that is substantially the same as the head 38 on the dampener piston 12 and that is also slidably positioned within the bore 36 of the sleeve 34. A stem 56 of the drive piston 14 extends through an end cap 58 to the exterior of the cylinder 10. The end cap 58 may be threadedly attached, press fitted or otherwise secured to the cylinder 10 and holds the sleeve 34 and the inside end cap 32 in tight engagement with respect to each other and also relative to the face of the cylinder 10 defined by the intersection of the bores 24 and 26. Whatever way is selected should afford a relatively air-tight connection. The fit between the stem 56 and the bore in the end cap 58 should likewise be relatively air-tight.

A chuck, shown generally at 60 in FIGURE 1, comprises an L-shaped member 62 that is suitably affixed to the end of the stem 56. By way of example, a socket connection can be employed to prevent relative rotation and a set screw (not shown) may be employed to limit relative axial movements. A blade retainer 64 fits between the L-shaped member 62 and a clamp piece 66 for the chuck 60. The clamp piece 66 is adjustably connected to the L-shaped member 62 as by set screws. Any conventional clamping connection at 68 is used to join the saw tool 22 to the blade retainer 64. It should be noted that the type of tool used, i.e., whether it is for scraping, polishing, sawing, etc., will determine the type of connection made with the chuck 60 and, of course, this connection can be varied considerably as those familiar with the art will appreciate.

To prevent rotation of the chuck 60 and, accordingly, of the saw tool 22, the L-shaped member 62 at the upper end is slidably joined to a rod 70 which may be attached to the end cap 58. This connection should be relatively free of friction so as to not interfere with reciprocating movements of the drive piston 14.

In describing the various passages or ports for transfer of the air under pressure it should be recognized that FIGURES 2 and 3 are intended to show these ports somewhat schematically. Obviously, the manner of porting the parts can vary considerably. Then too, when the various parts are installed, the different ports in the parts will have to be aligned in any known way.

Considering now the different air ports, the numeral 72 designates an inlet passage or port that has branches 74 and 76 opening into annular grooves formed respectively in the inside end cap 32 and in the end cap 58. The pistons 12 and 14 each have a pair of supply ports. Those in the dampener piston 12 have the numerals 78 and 80, whereas the corresponding ones in the drive piston 14 have the numerals 82 and 84.

To describe the operation, reference is first made to FIGURE 2 wherein the two pistons 12 and 14 are in what will be referred to as their outboard positions. In FIGURE 3 these will be designated as the pistons' inboard positions. With the pistons 12 and 14 in their outboard positions in FIGURE 2 and with the manual valve 20 open, air under pressure will be supplied via the inlet port 72 to the branches 74 and 76. From the branch 74 the air will proceed by way of the supply port 78 in the stem 30 of the dampener pitson 14 to the outboard face of the head 38. From the branch 76 the air will proceed by way of the corresponding supply port 82 in the drive piston stem 56 and act against the outboard face of the head 54. At this time the space between the heads 38 and 54 of the pistons 12 and 14 is open to the exterior of the cylinder via exhaust openings 42 and 44 and exhaust ports 50 and 52. Hence, the space defined by the inboard faces of the heads 38 and 54 is maintained at atmospheric pressure. As a consequence, the compressed air will force the pistons 12 and 14 together or to their inboard positions illustrated in FIGURE 3.

As the two pistons 12 and 14 move toward their FIGURE 3 inboard positions the supply ports 78 and 82 move out of communication with the branches 76 and 74. However, the air continues to expand so that movement of the pistons 12 and 14 also continues until their heads 38 and 54 uncover the exhaust openings 40 and 48, whereupon the air will be exhausted and the pistons 12 and 14 will stop at the demonstrated points. In these inboard positions the branches 74 and 76 become aligned with the supply passages 80 and 84, respectively. Hence, air under pressure from the inlet port 72 proceeds to the area defined by the inboard faces of the heads 38 and 54. This compressed air urges the pistons 12 and 14 apart, being greater than the atmospheric pressure now acting on the opposite or outboard faces of the heads 38 and 54, and the pistons 12 and 14 return to the outboard poistions. In moving to their outboard positions, the heads 38 and 54 respectively reopen the exhaust openings 44 and 42 so that the compressed air is relieved. This cycle continuously repeats itself at a frequency determined by the usual factors; e.g., the air pressure, the strokes of the pistons 12 and 14, and the piston masses.

As will be appreciated from the just described operation, the use of two pistons arranged in this embodiment for rectilinear motion and having a common axis removes the reaction forces acting on the cylinder and hence completely eliminates vibrations, provided the mass of the dampener piston 12 and of the drive piston 14 are substantially equal. To insure that this is achieved, the two pistons 12 and 14 are made to substantially the same dimensions and of the same materials so as to have the same mass. Then the magnitude of the weight 28 is selected to correspond to that of the saw tool 22 and any other intervening structure such as the blade retainer 64 and the chuck 60. Consequently, the combined mass of the saw tool 22 and the structure connecting it to the drive piston 14 and the drive piston 14 are equal to the combined mass of the dampener piston 12 and its weight 28.

Just by an inspection of FIGURES 2 and 3 it will be appreciated how the reaction forces are absorbed. In FIGURE 2 the air pressure acting against the face of the end cap 58 is exactly balanced by the air pressure acting against the face of the inside end cap 32. Hence, they cancel. In FIGURE 3 with the pistons 12 and 14 in their inboard positions, the air pressure acts on the inboard faces of the heads 38 and 54 and again does not transfer any unbalanced force to the cylinder 10.

Because the reciprocating tool is vibration-free the usual size problems encountered when designing for hand operation are completely overcome, permitting the reciprocating tool to be quite small and easily gripped. Then too, when the saw tool 22 is stalled for some reason in the workpiece, the dampener piston 12 continues to operate somewhat in the way of a hammer and will drive the tool, thus facilitating the freeing of the tool if wedged in the workpiece or at least continuing the work until the appropriate corrections can be made.

The invention is to be limited only by the following claims.

What is claimed is:

1. A reciprocating tool comprising a housing, a pair of movable elements mounted within the housing, means supplying energy to the housing for producing oscillatory movement of the elements relative to each other and in both directions, one of the movable elements having a driven tool member drive-connected thereto to serve as an external load during operation of the reciprocating tool, the other of the elements being unconnected to an external load and having a weight joined thereto, the weight being of predetermined magnitude so that the combined masses of the other movable element and the weight correspond to the combined masses of the one movable element and the driven tool member thereby enabling the other of the elements to be operative to prevent unbalanced forces from being applied to the housing for affording vibration-free operation of the reciprocating tool.

2. A reciprocating tool comprising a housing, a pair of elements movably mounted within the housing and so arranged as to be movable in a common plane, means supplying energy to the housing for producing oscillatory movement of the elements relative to each other and in both directions, one of the elements having a driven tool member drive-connected thereto to serve as an external load during operation of the reciprocating tool, the other of the elements being unconnected to an external load and having a weight joined thereto, the weight being of a certain magnitude so that the combined masses of the other movable element and the weight are substantially equal to the combined masses of the one movable element and the driven tool member thereby enabling the other of the elements to serve as a dampener and prevent unbalanced forces from being applied to the housing for affording vibration-free operation of the reciprocating tool.

3. A reciprocating tool comprising a pair of movable elements so arranged as to be movable within a common plane, means supplying energy to the movable elements so as to cause the movable elements to have imposed thereon substantially equal and oppositely acting forces for oscillating the elements in both directions relative to each other and in the common plane, one of the movable elements having a driven tool member drive-connected thereto to serve as an external load during operation of the reciprocating tool, the other of the elements being unconnected to an external load and having a weight joined thereto, the weight being of a predetermined magnitude so that the mass of the weight and the mass of the driven member have a certain correspondence to enable the other of the elements to compensate for unbalanced forces and thereby provide vibration-free operation of the reciprocating tool.

4. A reciprocating tool comprising a housing, driving and dampener elements movably mounted within the housing, the housing and each of the elements having coacting ports operable to supply fluid pressure to the housing for imposing equal and oppositely acting forces on the elements for reciprocating the elements relative to each other and in both directions of reciprocating movement, the driving element having a driven tool member drive-connected thereto to serve as an external load during operation of the reciprocating tool, the dampener element being unconnected to an external load and having a weight joined thereto, the weight being of a predetermined magnitude so that the combined masses of the dampener element and the weight correspond to the combined masses of the driving element and the driven tool member and the dampener element is operative to prevent unbalanced forces from being applied to the housing thereby affording vibration-free operation of the reciprocating tool.

5. A reciprocating tool comprising a housing, driving and dampener pistons each mounted within the housing for reciprocating movement along a common axis, means introducing energy into the housing for oscillating the pistons relative to each other and in both directions of reciprocating movement, the driving piston having a driven tool member connected thereto to serve as an external load during operation of the reciprocating tool, the dampener piston being unconnected to an external load and having a weight joined thereto, the weight being of a predetermined magnitude so that the combined masses of the dampener piston and the weight correspond to the combined masses of the driving piston and the driven tool member and the dampener piston is operative to prevent unbalanced forces from being applied to the housing thereby affording vibration-free operation.

6. A reciprocating tool comprising a housing, driving and dampener pistons each mounted within the housing for reciprocating movement along a common axis, means introducing energy into the housing for oscillating the pistons relative to each other and in both directions of reciprocating movement, the driving piston having a driven tool member drive-connected thereto to serve as an external load during operation of the reciprocating tool, the dampener piston being unconnected to an external load and having a weight joined thereto of a predetermined magnitude, the mass of the weight being so related to the mass of the driven tool member that the dampener piston is operative to prevent unbalanced forces from being applied to the housing thereby affording vibration-free operation of the reciprocating tool.

7. A reciprocating tool comprising the combination of a housing having a bore and being provided with an inlet port, a source of pressure fluid communicating with the inlet port, driving and dampener pistons mounted within the bore for reciprocating movement relative to each other and along a common axis, the pistons each having supply ports therein arranged in different positions of the pistons to communicate with the inlet port and cause pressure fluid to be applied to the pistons so as to move the pistons respectively towards and away from each other, the driving piston having a driven tool member drive-connected thereto to serve as an external load during operation of the reciprocating tool, the dampener piston being unconnected to an external load and having a weight joined thereto of a predetermined magnitude so that the combined masses of the driving piston and the driven tool member is substantially equal to the combined masses of the dampener piston and the weight thereby preventing unbalanced forces from being transferred to the housing for affording vibration-free operation of the reciprocating tool.

8. A reciprocating tool comprising a cylinder having a bore therein provided with an inlet port communicating with the opposite ends of the bore and a series of exhaust ports also communicating with the bore, a source of pressure fluid operatively connected to the inlet port, a pair of pistons mounted within the bore for reciprocating movement along a common axis and between inboard and outboard positions, the pistons each having inboard sides in confronting relation, outboard sides, and a pair of supply ports, one of the supply ports communicating with the inlet port in the outboard positions of the pistons and delivering pressure fluid to the outboard sides of the pistons so as to effect movements thereof to the inboard positions thereof, the other supply port communicating with the inlet port in the inboard positions of the pistons and delivering pressure fluid to the inboard sides of the pistons so as to effect movements thereof to the outboard positions thereof, the exhaust ports being so arranged as to exhaust the outboard and inboard sides of the pistons when the pistons are respectively in the inboard and outboard positions, one of the pistons having a driven tool member drive-connected thereto, the other of the pistons having a weight joined thereto of a predetermined magnitude so that the combined masses of the one piston and the driven tool member are substantially equal to the combined masses of the other piston and the weight thereby affording vibration-free reciprocation of the tool.

9. A reciprocating tool comprising in combination a cylinder having a bore therein provided with an inlet port communicating with opposite ends of the bore and a series of exhaust ports arranged between the ends of the bore, a source of pressure fluid operatively connected to the inlet port, a pair of substantially identical pistons mounted within the bore for reciprocating movement along a common axis, each piston having a pair of supply ports therein, one of the supply ports being so arranged that in one position of the associated pistons communication is established with the inlet port and pressure fluid is delivered to the area between the pistons thereby causing the pistons to move away from each other, another of the supply ports being so arranged that in another position of the associated positions communication is established with the inlet port and pressure fluid is delivered to an area between the pistons and the ends of the bore thereby causing the pistons to move towards each other, the series of exhaust ports being so arranged as to exhaust the area not being supplied with pressure fluid so as to facilitate the movement of the pistons away from and towards each other, one of the pistons having a driven tool member drive-connected thereto, the other of the pistons having a weight joined thereto of such a magnitude that the combined masses of the one piston and the driven tool member are substantially equal to the combined masses of the other piston and the weight thereby affording vibration-free operation of the reciprocating tool.

References Cited by the Examiner

UNITED STATES PATENTS

| | | | |
|---|---|---|---|
| 2,196,224 | 4/1940 | Morgan | 91—234 |
| 2,590,155 | 3/1952 | Cannon | 91—234 |
| 2,957,462 | 10/1960 | Clark | 91—232 |

SAMUEL LEVINE, *Primary Examiner.*

FRED E. ENGELTHALER, *Examiner.*